United States Patent
Halberstadt et al.

(10) Patent No.: US 9,941,803 B1
(45) Date of Patent: Apr. 10, 2018

(54) CONTROLLER IC DEVICE FOR A SWITCHED MODE POWER CONVERTER AND METHOD FOR OPERATING A CONTROLLER IC DEVICE OF A SWITCHED MODE POWER CONVERTER

(71) Applicant: NXP B.V., Eindhoven (NL)

(72) Inventors: Hans Halberstadt, Groesbeek (NL); Peter Theodorus Johannes Degen, Arnhem (NL); Jacobus Peeters, Best (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/596,508

(22) Filed: May 16, 2017

(51) Int. Cl.
- *H02M 3/335* (2006.01)
- *H03K 17/795* (2006.01)
- *H02M 1/42* (2007.01)
- *H02M 1/08* (2006.01)
- *H02M 1/00* (2006.01)

(52) U.S. Cl.
CPC ......... *H02M 3/33523* (2013.01); *H02M 1/08* (2013.01); *H02M 1/42* (2013.01); *H03K 17/7955* (2013.01); *H02M 2001/0009* (2013.01)

(58) Field of Classification Search
CPC . H02M 2001/0003; H02M 2001/0025; H02M 3/33507
USPC .............................. 363/21.07, 21.15, 95, 97
See application file for complete search history.

(56) References Cited

U.S. PATENT DOCUMENTS

| | | | | |
|---|---|---|---|---|
| 5,313,381 A | * | 5/1994 | Balakrishnan .... | H02M 3/33507 363/131 |
| 5,892,355 A | * | 4/1999 | Pansier ............ | G01R 19/16519 323/315 |
| 5,982,640 A | * | 11/1999 | Naveed ............. | H02M 3/33523 363/21.15 |
| 6,914,793 B2 | * | 7/2005 | Balakrishnan .......... | H02M 1/32 323/299 |
| 8,089,783 B2 | * | 1/2012 | Tao ................... | H02M 3/33507 363/21.18 |
| 2004/0257833 A1 | * | 12/2004 | Yang ................. | H02M 3/33507 363/16 |
| 2009/0295348 A1 | * | 12/2009 | Tao ................... | H02M 3/33507 323/282 |

(Continued)

OTHER PUBLICATIONS

TEA19161T, "Digital controller for high-efficiency resonant power supply," Product Data Sheet, Rev. 1—Mar. 10, 2016, 46 pages.

Primary Examiner — Jeffrey Sterrett (57) ABSTRACT

Embodiments of a controller integrated circuit (IC) device for a switched mode power converter and a method of operating a controller IC device of a switched mode power converter are described. In one embodiment, a controller IC device for a switched mode power converter an input/output unit connected to an input/output node of the controller IC device and a controller unit. The input/output unit is configured to receive an input current from the input/output node and output an output voltage through the input/output node in response to an input voltage received at the input/output unit. The controller unit is configured to control voltage regulation of the switched mode power converter in response to the input current received from the input/output unit and generate the input voltage for the input/output unit. Other embodiments are also described.

20 Claims, 4 Drawing Sheets

(56) References Cited

U.S. PATENT DOCUMENTS

| | | | |
|---|---|---|---|
| 2015/0023069 A1* | 1/2015 | Zhu | H02M 3/33507 363/21.16 |
| 2016/0156171 A1* | 6/2016 | Xiao | H02M 1/32 361/18 |
| 2016/0359418 A1* | 12/2016 | Kawashima | H02M 1/44 |

* cited by examiner

CONTROLLER IC DEVICE FOR A SWITCHED MODE POWER CONVERTER AND METHOD FOR OPERATING A CONTROLLER IC DEVICE OF A SWITCHED MODE POWER CONVERTER

Embodiments of the invention relate generally to electronic hardware and methods for operating electronic hardware, and, more particularly, to controller integrated circuit (IC) devices for switched mode power converters and methods for operating a controller IC device for a switched mode power converter.

A switched mode power converter converts an input voltage to a desired output voltage using a switching regulator. A controller IC can be used to control the functions of a switched mode power converter. Typically, different input/output nodes (e.g., pins) of the controller IC are used for different purposes. However, the numbers of input/output nodes of a controller IC may be limited due to the encapsulation requirements of the controller IC.

SUMMARY

Embodiments of a controller IC device for a switched mode power converter and a method of operating a controller IC device of a switched mode power converter are described. In one embodiment, a controller IC device for a switched mode power converter an input/output unit connected to an input/output node of the controller IC device and a controller unit. The input/output unit is configured to receive an input current from the input/output node and output an output voltage through the input/output node in response to an input voltage received at the input/output unit. The controller unit is configured to control voltage regulation of the switched mode power converter in response to the input current received from the input/output unit and generate the input voltage for the input/output unit. Other embodiments are also described.

In an embodiment, the input/output unit includes a current mirror unit.

In an embodiment, the current mirror unit includes a current mirror circuit, a transistor connected to a first terminal of the current mirror circuit; and a resistor connected to a second terminal of the current mirror circuit.

In an embodiment, the transistor is connected to the input/output node and to the controller unit, the input voltage is received at a gate terminal of the transistor from the control unit, and the transistor is configured to receive the input current from the input/output node and to output the output voltage through the input/output node in response to the input voltage.

In an embodiment, the transistor is an NMOS transistor. A drain terminal of the NMOS transistor is connected to the first terminal of the current mirror circuit, and a source terminal of the NMOS transistor is connected to the input/output node.

In an embodiment, a first current is output from the first terminal of the current mirror circuit, a second current is output from the second terminal of the current mirror circuit, and the second current is identical with the first current.

In an embodiment, the resistor is connected to the controller unit and to a reference voltage.

In an embodiment, the controller IC device further includes a driver circuit configured to generate a drive voltage for a voltage regulator of the switched mode power converter in response to the input current that is received by the input/output unit.

In an embodiment, the input/output unit is configured to receive the input current from an optocoupler of the switched mode power converter that is connectable to an output voltage of the switched mode power converter.

In an embodiment, the output voltage indicates a voltage regulation status of the switched mode power converter.

In an embodiment, the input/output unit is configured to drive a switch that is connected to an optocoupler of the switched mode power converter using the output voltage.

In an embodiment, a controller device for a switched mode power converter includes a current mirror unit connected to a contact pin of the controller IC device and configured to receive an input current from a first optocoupler of the switched mode power converter that is connectable to an output voltage of the switched mode power converter from the contact pin and output an output voltage indicating a voltage regulation status of the switched mode power converter through the contact pin to drive a switch that is connected to a second optocoupler of the switched mode power converter in response to an input voltage received at the current mirror unit, and a controller unit configured to control voltage regulation of the switched mode power converter in response to the input current received from the current mirror unit and generate the input voltage for the current mirror unit.

In an embodiment, the current mirror unit includes a current mirror circuit, a transistor connected to a first terminal of the current mirror circuit, and a resistor connected to a second terminal of the current mirror circuit.

In an embodiment, the transistor is connected to the contact pin and to the controller unit, the input voltage is received at a gate terminal of the transistor from the control unit, and the transistor is configured to receive the input current from the contact pin and to output the output voltage through the contact pin in response to the input voltage.

In an embodiment, the transistor is an NMOS transistor, a drain terminal of the NMOS transistor is connected to the first terminal of the current mirror circuit, and a source terminal of the NMOS transistor is connected to the contact pin.

In an embodiment, a first current is output from the first terminal of the current mirror circuit, a second current is output from the second terminal of the current mirror circuit, and the second current is identical with the first current.

In an embodiment, the resistor is connected to the controller unit and to a reference voltage.

In an embodiment, a method for operating a controller IC device of a switched mode power converter involves receiving an input current from an input/output node of the controller IC device, controlling voltage regulation of the switched mode power converter in response to the input current received from the input/output node, and outputting an output voltage that indicates a voltage regulation status of the switched mode power converter through the input/output node.

In an embodiment, receiving the input current from the input/output node of the controller IC device involves receive the input current from an optocoupler of the switched mode power converter that is connectable to an output voltage of the switched mode power converter.

In an embodiment, the method further involves driving a switch that is connected to an optocoupler using the output voltage.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
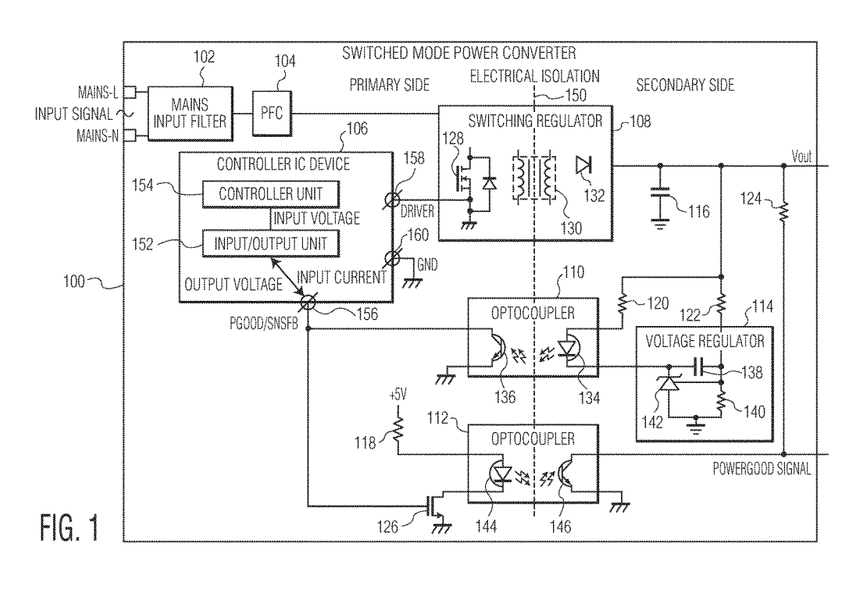
FIG. 1 is a schematic block diagram of a switched mode power converter that includes a controller IC device in accordance with an embodiment of the invention.

FIG. 1 is a schematic block diagram of a switched mode power converter 100 that includes a controller IC device 106 in accordance with an embodiment of the invention. The switched mode power converter converts an input voltage to a desired output voltage. The switched mode power converter can be used in various applications, such as automotive applications, communications applications, industrial applications, medical applications, computer applications, and/or consumer or appliance applications. In the embodiment depicted in FIG. 1, the switched mode power converter includes a mains input filter 102, a power factor controller (PFC) 104, the controller IC device 106, a switching regulator 108, a first optocoupler 110, a second optocoupler 112, and a voltage regulator 114. In some embodiments, the switched mode power converter is included in a computing device, such as a smartphone, a tablet computer, a laptop, etc. Although the switched mode power converter is shown in FIG. 1 as including certain circuit elements, in other embodiments, the switched mode power converter may include one or more additional circuit elements. For example, the switched mode power converter may include one or more capacitors 116, one or more resistors 118, 120, 122, 124, and/or one or more switches 126 connected between the controller IC device and the second optocoupler. Although the resistor 118 is shown in FIG. 1 as being connected to a positive voltage of 5V, in other embodiments, the resistor 118 is connected to other suitable voltage.

The mains input filter 102 is configured to filter the input signal of the switched mode power converter 100. In some embodiments, the mains input filter 102 is configured to filter the input signal received from input terminals, "mains-L," "mains-N" to reduce or minimize disturbances from and towards electrical mains.

The PFC 104 is configured to control the power factor value of the switched mode power converter 100. The power factor value of the switched mode power converter may be defined as the ratio of the actual electrical power used/dissipated by the switched mode power converter to the total power that is supplied to the switched mode power converter. In some embodiments, the PFC is configured to keep the power factor value of the switched mode power converter to be above/higher than a threshold value. For example, the PFC can be used in a high power application (e.g., an application with more than 75 W of electrical power) to keep the power factor value of the switched mode power converter higher than a minimum PF value.

The controller IC device 106 is configured to control certain functions of the switched mode power converter 100. The controller IC device can be implemented in a substrate, such as a semiconductor wafer. In an embodiment, the controller IC device is packaged as a semiconductor IC chip. The controller IC device may be implemented as logic circuits. In the embodiment depicted in FIG. 1, the controller IC device includes an input/output unit 152, a controller unit 154, and input/output nodes 156, 158, 160. In an embodiment, the input/output nodes are electrical terminals of the controller IC device, such as electrical contact pads or electrical contact pins of the controller IC device. For example, the controller IC device is packaged as an IC chip and input/output nodes 156, 158, 160 are contact pins on the IC chip. In some embodiments, the input/output node 156 is also referred to as the PowerGood/SenseFeedback (PGOOD/SNSFB) input/output node, the input/output node 160 is also referred to as the ground (GND) input/output node, and the input/output node 158 is also referred to as the driver input/output node. Although the controller IC device is shown in FIG. 1 as including the input/output unit and the controller unit, in other embodiments, the controller IC device may include one or more additional circuit elements. For example, the switched mode power converter may include a driver circuit configured to generate a drive voltage for the switching regulator 108 of the switched mode power converter in response to an input current that is received through the input/output node 156. In addition, although the controller IC device is shown in FIG. 1 as including the input/output nodes 156, 158, 160, in other embodiments, the controller IC device may include one or more additional input/output nodes.

In the embodiment depicted in FIG. 1, the input/output unit 152 is configured to receive an input current from an input/output node 156 and to output an output voltage through the same input/output node 156 in response to an input voltage received at the input/output unit. The output voltage that is output through the input/output node 156 may indicate a voltage regulation status of the switched mode power converter. The voltage regulation status of the switched mode power converter may designate whether or not the switched mode power converter operates properly and converts an input voltage into a desired output voltage. For example, the output voltage that is output through the input/output node 156 can indicate that the output voltage, Vout, of the switched mode power converter 100 is in regulation (i.e., being properly regulated in the switched mode power converter). Alternatively, the output voltage that is output through the input/output node 156 can indicate that the switched mode power converter operates normally to generate the desired output voltage, Vout. In another example, the output voltage that is output through the input/output node 156 can indicate that the output voltage, Vout, of the switched mode power converter 100 will be out of regulation (i.e., not being properly regulated in the switched mode power converter). Alternatively, the output voltage that is output through the input/output node 156 can indicate that the switched mode power converter does not operate normally to generate the desired output voltage, Vout. In some applications, such as personal computer (PC) applications, a PowerGood signal can be used to indicate that the output voltage, Vout, of the switched mode power converter 100 is in regulation. If the switched mode power converter stops regulating the output voltage, for instance because the mains input is disconnected, the switched mode power converter provides a pre-warning to a corresponding device via the PowerGood (PGOOD) signal indicating that the output voltage of the switched mode power is about to be out of regulation. The corresponding device can use the time between the pre-warning and the output voltage being out of regulation to store important information or to perform other actions. The input/output unit may be further configured to receive the input current from the first optocoupler 110 that is connectable to the output voltage, Vout, of the switched mode power converter. In some embodiments, the input/output unit is configured to drive the switch 126 that is connected to the second optocoupler 112 using the output voltage. The input/output unit may be implemented in suitable circuit elements, such as transistors and/or resistors. In some embodiments, the input/output unit is implemented as a current mirror unit having two branches with identifiable currents.

In the embodiment depicted in FIG. 1, the controller unit 154 is configured to control voltage regulation of the switched mode power converter 100 in response to the input current received from the input/output unit 152 and to generate the input voltage for the input/output unit. The controller unit may be implemented in suitable logical circuits. In some embodiments, the controller unit is implemented as a microcontroller. In an example operation of the controller IC device 106, the input/output unit converts the current from the PGOOD/SNSFB input/output node 156 into digital information for the controller unit. The controller unit sends a powergood status signal reflecting the powergood status to the input/output unit, which converts the powergood status signal into a voltage that is applied to the PGOOD/SNSFB input/output node.

In the embodiment depicted in FIG. 1, the controller IC device 106 uses the input/output node 156 to receive an input current, which can be used to control voltage regulation of the switched mode power converter 100, and to output an output voltage that can be used to indicate a voltage regulation status of the switched mode power converter. Consequently, the controller IC device can use the input/output node 156 for different purposes. Compared to a controller IC that uses one input/output node to receive an input current and another input/output node to output an output voltage, the controller IC device depicted in FIG. 1 can reduce the total number of input/output nodes (e.g., pins) needed for a controller IC device. Consequently, the controller IC device depicted in FIG. 1 can be used in applications that have stringent encapsulation requirements.

The switching regulator 108 is configured to generate the output voltage, Vout, in response to the input signal received at the mains input filter 102 and a control signal or a drive signal from the controller IC device 106. In some embodiments, the input signal received at the mains input filter is an Alternating Current (AC) signal and the output voltage, Vout, is a Direct Current (DC) voltage. In the embodiment depicted in FIG. 1, the switching regulator converts the output of the PFC 104 into a regulated output voltage. The switching regulator may be implemented as a resonant converter, a flyback converter or other types of switching regulators that are well known in the art. In some embodiments, the switching regulator includes at least one transistor 128, a transformer 130, and/or a diode 132.

The first optocoupler 110 is used to control the power to be converted in the switched mode power converter 100 and for electrical isolation (as represented by dashed line 150) between the primary side of the switched mode power converter and the secondary side of the switched mode power converter. In the embodiment depicted in FIG. 1, the first optocoupler includes a light-emitting diode (LED) 134 and a photo transistor 136. In some embodiments, the LED is driven by an error loop that senses and regulates a secondary side variable of the switched mode power converter such as the output voltage of the switched mode power converter. In these embodiments, the photo transistor 136 defines a current level in the input/output node 156 of the controller IC device 106. For example, a regulation loop, which is formed by the voltage regulator 114, the controller IC device, the switching regulator 108, and the first optocoupler, senses the difference between a desired output voltage and the actual output voltage, Vout, and sends an error signal in the current domain (e.g., a current signal) to the primary side (e.g., the input/output node 156 of the controller IC device). In an embodiment, the collector of the photo transistor 136 is connected to an internal voltage source of the controller IC device 106 and the current in the voltage source is sensed and used to derive the converted power level of the switched mode power converter.

The second optocoupler 112 is used for electrical isolation between the primary side of the switched mode power converter and the secondary side of the switched mode power converter. In the embodiment depicted in FIG. 1, the second optocoupler includes an LED 144 and a photo transistor 146. In some embodiments, the LED is driven by a voltage signal from the controller IC device 106, for example, through the switch 126. The switch 126 may be implemented as at least one transistor such as a metal-oxide-semiconductor field-effect transistor (MOSFET) having a diode connected to its source terminal, which provides adequate voltage headroom for the photo transistor to operate. In these embodiments, the photo transistor 146 sets the POWERGOOD signal in response to the voltage signal from the controller IC device. For example, when the voltage signal on the input/output node 156 of the controller IC device is at logic high, the second optocoupler sets the POWERGOOD output signal to logic low.

The voltage regulator 114 is configured to regulate or control the output voltage, Vout, of the switched mode power converter 100. In the embodiment depicted in FIG. 1, the voltage regulator 114, the controller IC device 106, the switching regulator 108, and the first optocoupler 110 form a regulation loop. In an example operation, when the output voltage, Vout, increases, the current through the voltage regulator as well as the current through the first optocoupler increase. The current received on (e.g., pulled in by) the PGOOD/SNSFB input/output node of the controller IC device 106 is a measure of the output voltage, Vout, and the controller IC device can control the switching regulator to adjust the output voltage, Vout, accordingly if needed. In some embodiments, the voltage regulator includes at least one capacitor 138, a resistor 140, and/or a voltage regulator 142. In some embodiments, the resistor 122 is part of the voltage regulator 114.

Figure 2:
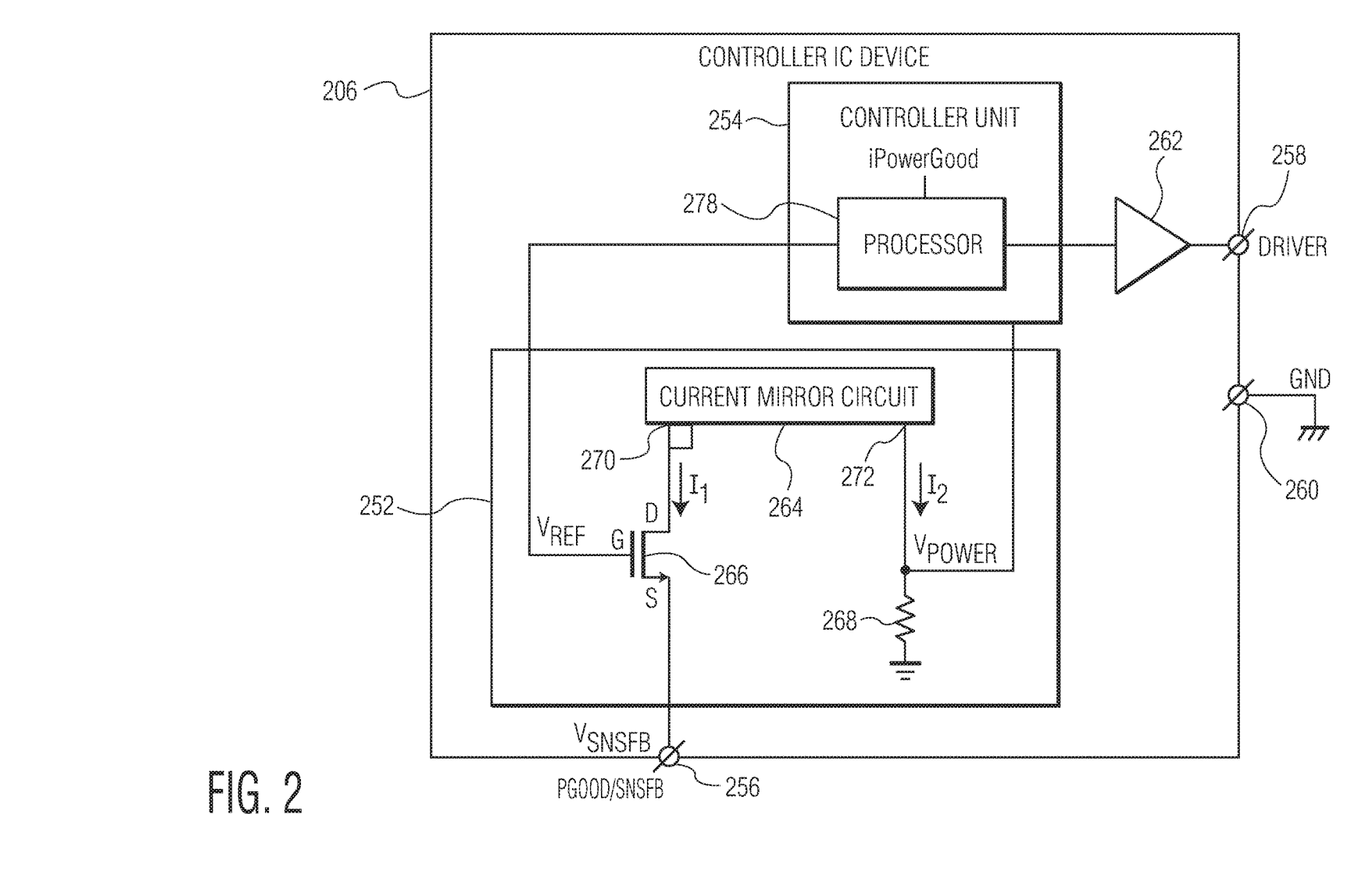
FIG. 2 depicts an embodiment of the controller IC device of FIG. 1.

FIG. 2 depicts an embodiment of the controller IC device 106 of FIG. 1. In the embodiment depicted in FIG. 2, a controller IC device 206 includes a current mirror unit 252, a controller unit 254, a driver unit 262, a PGOOD/SNSFB pin 256, a driver pin 258, and a ground (GND) pin 260. The current mirror unit may be configured to receive an input current from the first optocoupler 110 (FIG. 1) of the switched mode power converter 100 that is connectable to the output voltage, Vout, of the switched mode power converter from the PGOOD/SNSFB pin 256 and to output an output voltage indicating a voltage regulation status of the switched mode power converter through the PGOOD/SNSFB pin to drive the transistor 126 (FIG. 1) that is connected to the second optocoupler 112 (FIG. 1) of the switched mode power converter in response to an input voltage received at the current mirror unit. The controller unit may be configured to control voltage regulation of the switched mode power converter in response to the input current received from the current mirror unit and to generate the input voltage for the current mirror unit. The driver unit may be configured to generate a drive voltage for the switching regulator 108 of the switched mode power converter 100 in response to an input current that is received by the current mirror unit through the PGOOD/SNSFB pin. The current mirror unit, the controller unit, the PGOOD/SNSFB pin, the driver pin, and the GND pin depicted in FIG. 2 are embodiments of the input/output unit 152, the controller unit 154, and the input/output nodes 156, 158, 160 depicted in FIG. 1, respectively. The controller IC device depicted in FIG. 2 is a possible implementation of the controller IC device depicted in FIG. 1. However, the controller IC device depicted in FIG. 1 can be implemented differently from the controller IC device depicted in FIG. 2.

In the embodiment depicted in FIG. 2, the current mirror unit 252 includes a current mirror circuit 264, an n-channel MOSFET (NMOS) transistor 266 connected to a first terminal 270 of the current mirror circuit, and a resistor 268 connected to a second terminal 272 of the current mirror circuit. The current mirror circuit can be implemented as a suitable current mirror as is known in the art. Examples of the current mirror circuit include, without being limited to, MOSFET current mirrors, bipolar junction transistor (BJT) current mirrors, and feedback assisted current mirrors. A first current, "$I_1$," is output from the first terminal 270 of the current mirror circuit and a second current, "$I_2$," which mirrors the first current, $I_1$, is output from the second terminal 272 of the current mirror circuit. The NMOS transistor includes a source terminal, "S," a gate terminal, "G," and a drain terminal, "D." In the embodiment depicted in FIG. 2, the source terminal, S, of the NMOS transistor is connected to the PGOOD/SNSFB pin 256, the gate terminal, G, of the NMOS transistor is connected to the controller unit 254, and the drain terminal, D, of the NMOS transistor is connected to the terminal 270 of the current mirror unit. The resistor is connected to the controller unit and to a reference voltage, such as the ground or other suitable voltage. The NMOS transistor receives a reference voltage, "Vref," from the controller unit and an input current from the PGOOD/SNSFB pin 256 and outputs an output voltage through the PGOOD/SNSFB pin in response to the reference voltage, Vref. The current pulled out of the PGOOD/SNSFB pin can be used as a measure of the output voltage, Vout, of the switched mode power converter 100, while the output voltage at the PGOOD/SNSFB pin can used to drive the switch 126 (FIG. 1), which drives the second optocoupler 112 (FIG. 1) that generates the POWERGOOD signal.

In the embodiment depicted in FIG. 2, the controller unit 254 includes a processor 278, which may be a general purpose processor such as a central processing unit (CPU) or a specific purpose processor. The processor may be configured to generate the reference voltage, Vref, to be applied to the NMOS transistor 266 based on an internal power good signal (iPowerGood) and to control the driver unit 262 for generating a drive voltage for the switching regulator 108 in response to the voltage, "Vpower," from the current mirror unit 252.

Figure 3:
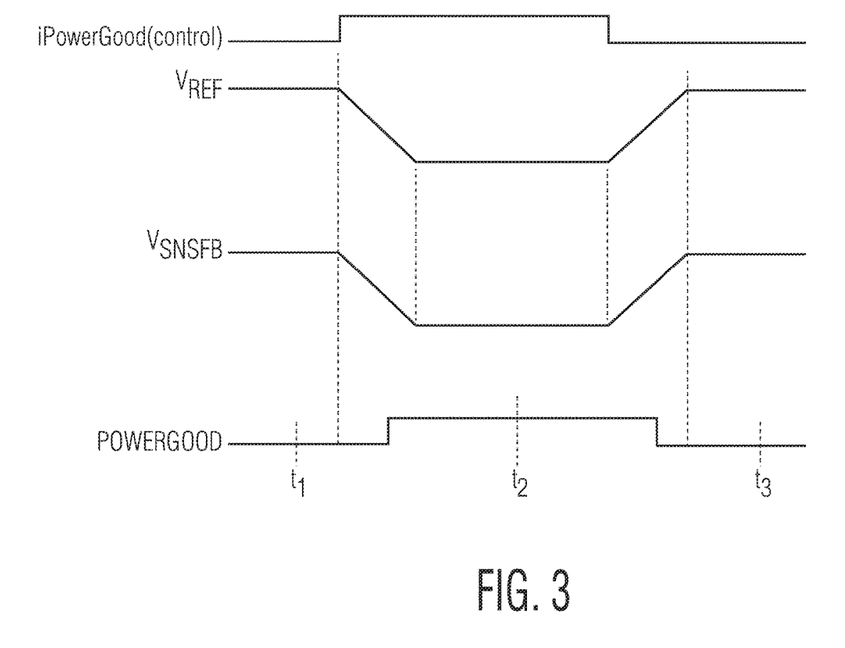
FIG. 3 illustrates a signal timing diagram of the controller IC device depicted in FIG. 2.

FIG. 3 illustrates a signal timing diagram of the controller IC device 206 depicted in FIG. 2. At time point, "t1," the internal power good signal (iPowerGood) of the controller unit 254 indicates that the output voltage, Vout, of the switched mode power converter 100 is not (e.g., not yet) in regulation (i.e., not being properly regulated in the switched mode power converter). Consequently, the controller unit sets the reference voltage, Vref, at a high level. The high level is applied at the gate terminal, G, of the transistor 266, which pulls the voltage, $V_{SNSFB}$, at the PGOOD/SNSFB pin 256 up to a high level. Due to the high voltage on the PGOOD/SNSFB pin, the second optocoupler 112 pulls the POWERGOOD signal low, indicating to a load device that the output voltage, Vout, of the switched mode power converter is not in regulation. The current pulled out of the PGOOD/SNSFB pin, which is a measure of the output voltage, Vout, of the switched mode power converter, is copied via the current mirror circuit 264 to the resistor 268. The voltage, Vpower, across the resistor 268 is a measure of the output voltage, Vout, of the switched mode power converter.

At time point, "t2," the internal power good signal (iPowerGood) in of the controller unit 254 indicates that the output voltage, Vout, of the switched mode power converter 100 is in regulation (i.e., being properly regulated in the switched mode power converter). Consequently, the controller unit sets the reference voltage, Vref, at a low level. The low level is applied at the gate terminal, G, of the transistor 266, pulling the voltage, $V_{SNSFB}$, at the PGOOD/SNSFB pin 256 also to a low level. Due to the low voltage on the PGOOD/SNSFB pin, the second optocoupler 112 is not conducting and the resistor 124 pulls the POWERGOOD signal high, indicating to a load device that the output voltage, Vout, of the switched mode power converter is in regulation. The current pulled out of the PGOOD/SNSFB pin, which remains the same, is copied via the current mirror circuit 264 to the resistor 268. The voltage, Vpower, across the resistor 268 is still a measure of the output voltage, Vout, of the switched mode power converter. Consequently, independent of the POWERGOOD signal, the output voltage, Vout, of the switched mode power converter can be regulated. When the internal power-good signal (iPowerGood) changes value, the voltage, $V_{SNSFB}$, at the PGOOD/SNSFB pin changes value via a slope, which is used to avoid disturbances in the regulation loop formed by the voltage regulator 114, the controller IC device, the switching regulator 108, and the first optocoupler 110, when the POWERGOOD signal changes value.

At time point, "t3," the internal power good signal (iPowerGood) of the controller unit 254 indicates that the output voltage, Vout, of the switched mode power converter 100 is no longer in regulation. Consequently, the controller unit sets the reference voltage, Vref, at a high level. The high level is applied at the gate terminal, G, of the transistor 266, pulling the voltage, $V_{SNSFB}$, at the PGOOD/SNSFB pin 256 also to a high level. Due to the high voltage on the PGOOD/SNSFB pin, the second optocoupler 112 pulls the POWERGOOD signal low, indicating to a load device that the output voltage, Vout, of the switched mode power converter is not in regulation. The current pulled out of the PGOOD/SNSFB pin, which is a measure of the output voltage, Vout, of the switched mode power converter, is copied via the current mirror circuit 264 to the resistor 268. The voltage, "Vpower," across the resistor 268 is a measure of the output voltage, Vout, of the switched mode power converter.

Figure 4:
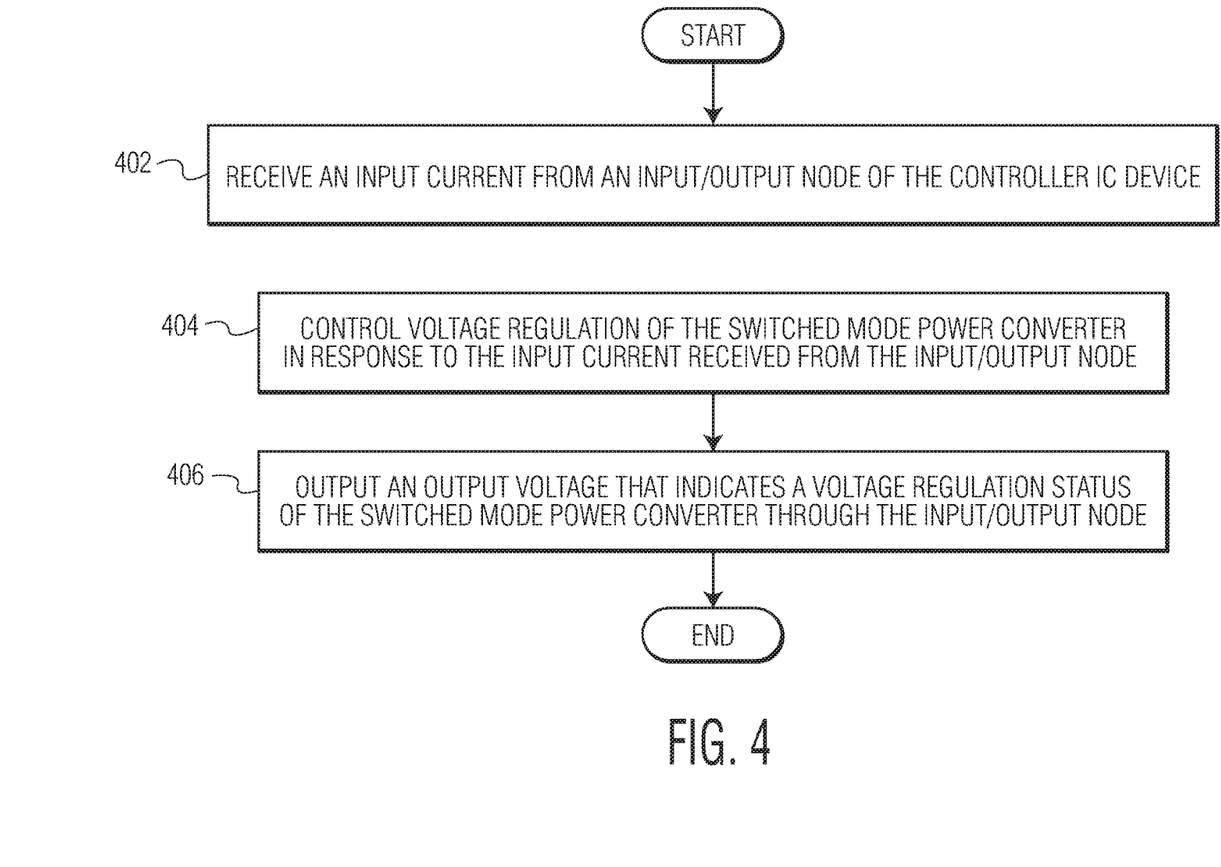
FIG. 4 is a process flow diagram that illustrates a method for operating a controller IC device of a switched mode power converter in accordance with an embodiment of the invention.

FIG. 4 is a process flow diagram that illustrates a method for operating a controller IC device of a switched mode power converter in accordance with an embodiment of the invention. At block 402, an input current is received from an input/output node of the controller IC device. At block 404, voltage regulation of the switched mode power converter is controlled in response to the input current received from the input/output node. At block 406, an output voltage that indicates a voltage regulation status of the switched mode power converter is output through the input/output node. The controller IC device may be the same as or similar to the controller IC device 106 depicted in FIG. 1 and/or the controller IC device 206 depicted in FIG. 2. The switched mode power converter may be the same as or similar to the switched mode power converter 100 depicted in FIG. 1. The input/output node may be the same as or similar to the input/output node 156 depicted in FIG. 1 and/or the PGOOD/SNSFB pin 256 depicted in FIG. 2.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A controller integrated circuit (IC) device for a switched mode power converter, the controller IC device comprising:
   an input/output unit connected to an input/output node of the controller IC device, wherein the input/output unit is configured to:
      receive an input current from the input/output node; and
      output an output voltage through the input/output node in response to an input voltage received at the input/output unit; and
   a controller unit configured to:
      control voltage regulation of the switched mode power converter in response to the input current received from the input/output unit; and
      generate the input voltage for the input/output unit.

2. The controller IC device of claim 1, wherein the input/output unit comprises a current mirror unit.

3. The controller IC device of claim 2, wherein the current mirror unit comprises:
   a current mirror circuit;
   a transistor connected to a first terminal of the current mirror circuit; and
   a resistor connected to a second terminal of the current mirror circuit.

4. The controller IC device of claim 3, wherein the transistor is connected to the input/output node and to the controller unit, wherein the input voltage is received at a gate terminal of the transistor from the control unit, and wherein the transistor is configured to receive the input current from the input/output node and to output the output voltage through the input/output node in response to the input voltage.

5. The controller IC device of claim 4, wherein the transistor is an NMOS transistor, wherein a drain terminal of the NMOS transistor is connected to the first terminal of the current mirror circuit, and wherein a source terminal of the NMOS transistor is connected to the input/output node.

6. The controller IC device of claim 4, wherein a first current is output from the first terminal of the current mirror circuit, wherein a second current is output from the second terminal of the current mirror circuit, and wherein the second current is identical with the first current.

7. The controller IC device of claim 4, wherein the resistor is connected to the controller unit and to a reference voltage.

8. The controller IC device of claim 1, further comprising a driver circuit configured to generate a drive voltage for a voltage regulator of the switched mode power converter in response to the input current that is received by the input/output unit.

9. The controller IC device of claim 1, wherein the input/output unit is configured to receive the input current from an optocoupler of the switched mode power converter that is connectable to an output voltage of the switched mode power converter.

10. The controller IC device of claim 1, wherein the output voltage indicates a voltage regulation status of the switched mode power converter.

11. The controller IC device of claim 10, wherein the input/output unit is configured to drive a switch that is connected to an optocoupler of the switched mode power converter using the output voltage.

12. A controller integrated circuit (IC) device for a switched mode power converter, the controller IC device comprising:
a current mirror unit connected to a contact pin of the controller IC device and configured to:
receive an input current from a first optocoupler of the switched mode power converter that is connectable to an output voltage of the switched mode power converter from the contact pin; and
output an output voltage indicating a voltage regulation status of the switched mode power converter through the contact pin to drive a switch that is connected to a second optocoupler of the switched mode power converter in response to an input voltage received at the current mirror unit; and
a controller unit configured to:
control voltage regulation of the switched mode power converter in response to the input current received from the current mirror unit; and
generate the input voltage for the current mirror unit.

13. The controller IC device of claim 12, wherein the current mirror unit comprises:
a current mirror circuit;
a transistor connected to a first terminal of the current mirror circuit; and
a resistor connected to a second terminal of the current mirror circuit.

14. The controller IC device of claim 13, wherein the transistor is connected to the contact pin and to the controller unit, wherein the input voltage is received at a gate terminal of the transistor from the control unit, and wherein the transistor is configured to receive the input current from the contact pin and to output the output voltage through the contact pin in response to the input voltage.

15. The controller IC device of claim 14, wherein the transistor is an NMOS transistor, wherein a drain terminal of the NMOS transistor is connected to the first terminal of the current mirror circuit, and wherein a source terminal of the NMOS transistor is connected to the contact pin.

16. The controller IC device of claim 14, wherein a first current is output from the first terminal of the current mirror circuit, wherein a second current is output from the second terminal of the current mirror circuit, and wherein the second current is identical with the first current.

17. The controller IC device of claim 14, wherein the resistor is connected to the controller unit and to a reference voltage.

18. A method for operating a controller integrated circuit (IC) device of a switched mode power converter, the method comprising:
receiving an input current from an input/output node of the controller IC device;
controlling voltage regulation of the switched mode power converter in response to the input current received from the input/output node; and
outputting an output voltage that indicates a voltage regulation status of the switched mode power converter through the input/output node.

19. The method of claim 18, wherein receiving the input current from the input/output node of the controller IC device comprises receive the input current from an optocoupler of the switched mode power converter that is connectable to an output voltage of the switched mode power converter.

20. The method of claim 18, further comprising driving a switch that is connected to an optocoupler using the output voltage.

* * * * *